US011128962B2

(12) United States Patent
Feilner et al.

(10) Patent No.: US 11,128,962 B2
(45) Date of Patent: Sep. 21, 2021

(54) GROUPING OF HEARING DEVICE USERS BASED ON SPATIAL SENSOR INPUT

(71) Applicant: SONOVA AG, Staefa (CH)

(72) Inventors: Manuela Feilner, Egg bei Zürich (CH); Harald Kruger, Affoltern am Albis (CH); Anahi Balbi, Richterswil (CH); Claudio Santelli, Staefa (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/829,986

(22) Filed: Mar. 25, 2020

(65) Prior Publication Data

US 2020/0314564 A1    Oct. 1, 2020

(30) Foreign Application Priority Data

Mar. 28, 2019   (EP) ..................................... 19165761

(51) Int. Cl.
*H04R 25/00* (2006.01)

(52) U.S. Cl.
CPC ........... *H04R 25/48* (2013.01); *H04R 25/507* (2013.01); *H04R 25/554* (2013.01); *H04R 25/70* (2013.01);
(Continued)

(58) Field of Classification Search
CPC .... H04R 25/48; H04R 25/507; H04R 25/554; H04R 25/70; H04R 2225/41;
(Continued)

(56) References Cited

U.S. PATENT DOCUMENTS

| 7,330,541 B1 | 2/2008 | Surazski |
| 8,645,872 B2 | 2/2014 | Maxfield |
| 9,420,108 B1 | 8/2016 | Bostick |

(Continued)

FOREIGN PATENT DOCUMENTS

| CN | 106797519 | 5/2017 |
| EP | 1560140 | 8/2005 |

(Continued)

OTHER PUBLICATIONS

Anemuller, J. et al., "A Discriminative Learning Approach to Probabilistic Acoustic Source Localization," 14th International Workshop on Acoustic Signal Enhancement (IWAENC), Conference Paper, Sep. 2014. DOI: 10.1109/IWAENC.2014.6953346.

(Continued)

*Primary Examiner* — Brian Ensey
(74) *Attorney, Agent, or Firm* — ALG Intellectual Property, LLC

(57) ABSTRACT

Systems and methods for controlling hearing devices are disclosed. Each hearing device is worn by a user, the users of the hearing devices having a conversation and the hearing devices being communicatively interconnected with each other for data exchange to form a hearing device system. A method includes acquiring a sound signal of each user with a microphone of the hearing device of the user; acquiring spatial information of each user; determining conversation patterns from the spatial information acquired for all users; determining conversation groups from the conversation patterns; outputting the sound signals from the users with a hearing device, such that sound signals from users of a conversation group that the user of the hearing device is a member of are output to the user and that sound signals from users of conversations groups of which the user is not a member are muted.

14 Claims, 3 Drawing Sheets

(52) U.S. Cl.
CPC ...... *H04R 2225/41* (2013.01); *H04R 2225/55* (2013.01)

(58) Field of Classification Search
CPC ........... H04R 2225/55; H04R 2225/61; H04M 3/569; H04M 3/568
See application file for complete search history.

(56) References Cited

U.S. PATENT DOCUMENTS

| | | |
|---|---|---|
| 9,537,911 B1 | 1/2017 | Bostick |
| 9,591,141 B1 | 3/2017 | Bostick |
| 9,621,731 B2 | 4/2017 | Bostick |
| 2002/0181686 A1 | 12/2002 | Howard et al. |
| 2004/0052218 A1 | 3/2004 | Knappe |
| 2005/0239486 A1 | 10/2005 | D'Avello et al. |
| 2006/0176831 A1 | 8/2006 | Greenberg |
| 2015/0088501 A1 | 3/2015 | Recker |
| 2017/0048392 A1 | 2/2017 | Bostick |
| 2017/0048393 A1 | 2/2017 | Bostick |
| 2017/0311092 A1 | 10/2017 | Secall |
| 2017/0359467 A1* | 12/2017 | Norris ..................... H04S 7/304 |
| 2018/0359572 A1* | 12/2018 | Jensen ................. H04R 25/453 |

FOREIGN PATENT DOCUMENTS

| | | |
|---|---|---|
| EP | 2153693 | 2/2010 |
| EP | 3202160 | 4/2018 |
| WO | 2008082203 | 7/2008 |
| WO | 2012066734 | 5/2012 |
| WO | 2016050312 | 4/2016 |
| WO | 2017134300 | 8/2017 |

OTHER PUBLICATIONS

Hochreiter, S. et al., "Long Short-Term Memory," Neural Computation, 9(8):1735-1780, 1997.

Murray, S.O. et al., "The Sound of Simultaneous Speech, the Meaning of Interruption," Journal of Pragmatics 12(1988) 115-116. Elsevier Science Publishers B.V. (North-Holland).

Taylor, L. et al., "Improving Deep Learning Using Generic Data Augmentation," arXiv:1708.06020v1 [cx.LG] Aug. 20, 2017.

Adler, R.B. et al., "Understanding Human Communication," Oxford University Press, Twelfth Edition 2014.

Enfield, N.J. et al., "How We Talk: The Inner Workings of Conversation," Basic Books, 2017.

* cited by examiner

GROUPING OF HEARING DEVICE USERS BASED ON SPATIAL SENSOR INPUT

RELATED APPLICATIONS

The present application claims priority to EP Patent Application No. 19165761.8, filed on Mar. 28, 2019, and entitled "GROUPING OF HEARING DEVICE USERS BASED ON SPATIAL SENSOR INPUT," the contents of which are hereby incorporated by reference in their entirety.

BACKGROUND INFORMATION

In some hearing devices, a wireless network may be integrated, which may improve the communication in noise between users of the hearing devices. The hearing devices may be to pick-up the users' voice with their integrated microphones, may transmit the acquired audio signals to other hearing devices via the wireless network and may make the picked-up voice audible via the integrated speaker of another hearing device.

It may be that a large number of users is combined in such a network. If more than one conversation takes places within this network, the signal-to-noise ratio may decrease, when all active speakers are streamed to everybody. For example, for several users sitting in a restaurant, the conversation may split up into two conversations.

A user may manually mute some of the active speakers, to whom he is not listening to. Or the user may split up the network manually. However, this process may be cumbersome. Also the conversation groups may change dynamically, which makes it even more cumbersome to manually split up the network or to mute/unmute other users.

In US 2017048392 it is described that a conference call may be split into smaller breakout sessions, by providing an analysis of potential participants, based on specific search criteria, user generated rules, as well as personal attributes, such as biographical information and personal affinities.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
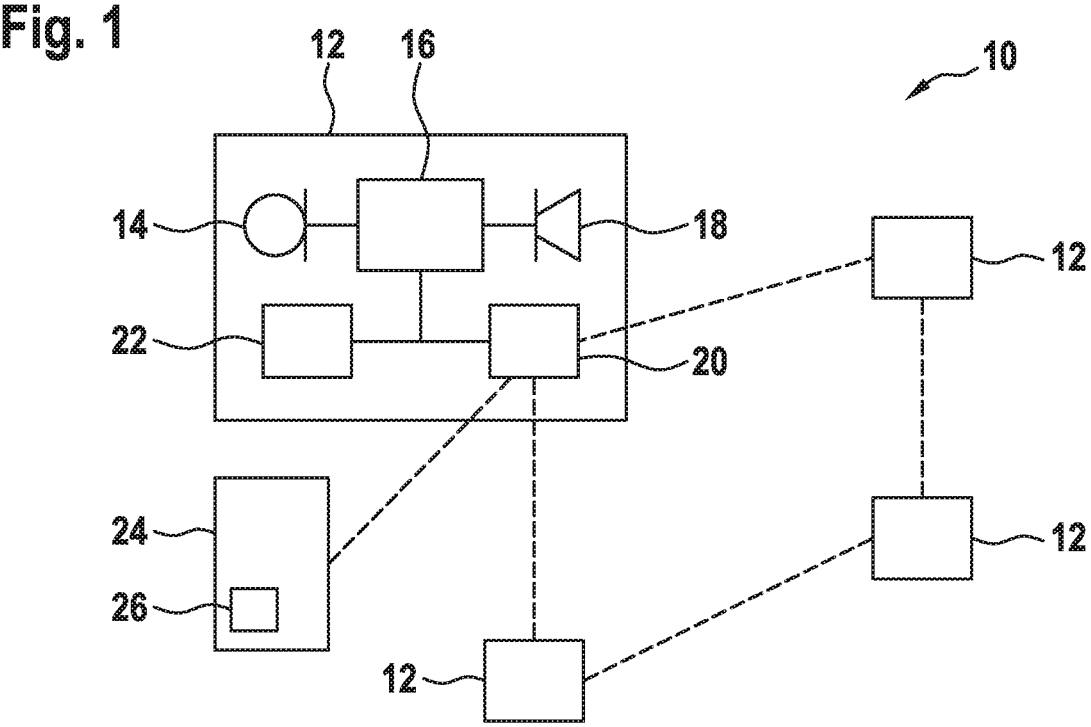
FIG. 1 schematically shows a hearing device system according to an embodiment.

Embodiments described herein provide an automated method, in which the signal-to-noise ratio in a hearing system composed of several hearing devices, in which audio signals are sent from an active speaker to other users of the hearing devices, is increased.

This is achieved by the subject-matter of the independent claims. Further exemplary embodiments are evident from the dependent claims and the following description.

An aspect described herein relates to a method for controlling hearing devices worn by users. A hearing device may include a processor, a microphone, a loudspeaker, a memory, and/or a housing, and other electronical and mechanical components. Examples of hearing devices are Behind-The-Ear (BTE), Receiver-In-Canal (RIC), In-The-Ear (ITE), Completely-In-Canal (CIC), and Invisible-In-The-Canal (IIC) devices. A hearing device may be a hearing aid adapted for compensating a hearing loss of a user.

Each of the hearing devices may comprise a data communication interface, such that it is adapted for communicating with the other hearing devices. The hearing devices may be communicatively interconnected with each other for data exchange to form a hearing device system.

According to an embodiment, the method comprises: acquiring a sound signal of each user with a microphone of the hearing device of the user. The method and the hearing device system may be used, when the users of the hearing devices have a conversation. During the conversation, the microphone of a hearing device may acquire a sound signal of the voice of the user. The hearing system may transmit this sound signal to other hearing devices of the hearing system, where it may be output by the loudspeakers of the other hearing devices.

According to an embodiment, the method comprises: acquiring spatial information of each user, the spatial information comprising at least one of a position of the user, a distance of the user to another user, a direction of the user with respect to another user. Spatial information may be information about the spatial orientation and/or distance of the users with respect to each other. Such information may be gathered with sensors, such as acceleration, movement and/or position sensors, which may be provided in the respective hearing device. It may be that the sensor is adapted for determining a head movement and/or a head orientation of the user.

It also may be that the sensor is adapted for determining, in which direction the user is looking to. Especially, if users are looking into the direction of an active speaking user. Such a looking direction may be determined with an eye tracking and/or gaze tracking system, which incorporates a camera as sensor.

It is also possible that radio signals received by the hearing device are used for determining the spatial information. For example, the radio signals sent by other hearing devices may be used for determining a distance, a direction and/or relative position of the hearing device with respect to a sending device, such as another hearing device. The radio signals of hearing devices may be analyzed to determine the orientation of the head of the user.

According to an embodiment, the method comprises: determining conversation patterns from the spatial information acquired for all users, wherein each conversation pattern comprises at least a probability that a user is talking to another user. A conversation pattern may be seen as a data structure, which encodes, how high the probability is that two users of the hearing devices are talking to each other and/or whether one user is talking to another user and/or whether a user is listening to another user.

The probability of a conversation pattern may be determined from the spatial information. For example, this probability may be higher for nearer users and lower for more distant users. As a further example, the probability may be dependent how strong the orientation (or direction) of the head of one user is aligned with a line between the user and a second user, which may be the active user.

It is noted that the probability also may depend on the evaluation of further information, such as the audio signals.

According to an embodiment, the method comprises: determining conversation groups from the conversation patterns, wherein the users are grouped into the conversation groups by clustering conversation patterns based on their probabilities. A conversation group may be seen as a data structure, which encodes, which user is a member of a conversation. It may be that a user is part of more than one conversation group. The conversation groups may be determined, such that conversation patterns with higher probabilities are clustered together, while conversation patterns with lower probabilities (i.e. lower than those, which are clustered) are not clustered together.

For example, present conversation patterns and/or conversation patterns with a probability higher than a threshold may be seen as links between users and a conversation group may be composed of those users, which are linked with each other.

According to an embodiment, the method comprises: outputting the sound signals from the users with a hearing device, such that sound signals from users of a conversation group, the user of the hearing device is a member of, are output to the user and that sound signals from users of conversations groups, the user is not a member, are muted. Only the sound signals may be output to the user, which are produced within the conversation group(s) of the user. Other sound signals from other conversation groups may be damped or may not be output to the user at all.

The method may be performed automatically by the hearing device system. With the method, the conversation groups may be determined automatically and/or dynamically. It has to be noted that two conversation groups may be merged, when it is determined two users of these groups have a joint conversation. It also may be possible that a conversation group is split up into two groups, when it is determined that the users have separate conversations.

According to an embodiment, the method further comprises: determining a conversation scenario from the spatial information and determining the conversation patterns additionally based on the conversation scenario; wherein a conversation scenario is indicative of a specific situation, the users are in. Examples for conversation scenarios are users in a car, users walking in a group, users sitting around a table, users standing in a group, etc. For example, when the users are moving in the same direction with fixed relative orientations, it may be assumed that the users are sitting in a car. As a further example, when the users are all facing each other, it may be assumed that the users are sitting around a table.

The conversation patterns also may be determined based on the conversation scenario. For example, in a car, the probability that a user is talking to a person in front of him, but is facing in the same direction may be higher than when the users are sitting around a table.

For example, the conversation patterns may be determined with a machine learning algorithm and there may be different machine learning algorithms for different conversation scenarios.

According to an embodiment, the conversation scenario is indicative of users facing each other in the specific situation and/or of users facing in the same direction in the specific situation. From the spatial information, the orientations of the users, i.e. user direction, may be determined. These orientations and/or directions may be defined by a vector, which is indicative of the orientation/direction of the head of the user. For example, a walking group of users or users in a car may be identified by substantially parallel orientations/directions.

According to an embodiment, the probability of a conversation pattern with a first user and a second user is dependent on the first user facing towards the second user. As already mentioned, the viewing direction of a user is a strong indicator, to whom the user is listening and/or speaking.

According to an embodiment, the probability of a conversation pattern with a first user and a second user is dependent on a distance of the first user and the second user. A further indicator is that users, which are nearer to each other, are more likely to speak with each other than remote users.

According to an embodiment, the spatial information may be acquired with a sensor of the hearing device of the user. Such a sensor may be a movement sensor and/or location sensor integrated into the hearing device.

According to an embodiment, the spatial information for a user is acquired with a movement sensor and/or a location sensor of the hearing device of the user. The movement sensor, which may be an acceleration sensor, may be a part of the hearing device, which may be worn be the user behind the ear and/or in the ear. However, it also may be that the spatial information for a user is acquired with a movement sensor and/or location sensor of an auxiliary device worn by the user, which is communicatively interconnected with the hearing device of the user. Such an auxiliary device may be a smartphone, for example. Also a camera as sensor may be used, for example such a camera may be integrated into glasses of the user. With the data from the camera, eye tracking of the user and/or other users may be performed.

According to an embodiment, the spatial information of a user is indicative of head movements of the user. The hearing device of the user may be worn on the head of the user.

According to an embodiment, the method further comprises: determining actual active speakers from the users by evaluating the sound signal from the users. An actual active speaker may be a user, which is currently talking. The sound signal of a user may be analyzed to detect, whether the user is currently speaking or not.

According to an embodiment, the probability of a conversation pattern with two users is dependent on the users being active speakers or not. For example, when a user is facing an active speaker, the probability of the conversation pattern may be higher, as when the other user is not speaking.

According to an embodiment, the probability of a conversation pattern with a user and the active speaker is dependent on a correlation of the sound signal acquired by the hearing device of the user and the sound signal acquired by the hearing device of the active speaker. Furthermore, the sound signal acquired by the hearing device of one user may be compared with the sound signal acquired by the hearing device of another user. When the voice of a first active speaker is louder in the audio signal of a user than the voice of a second active speaker, it is more likely that the user is listening to the first active speaker.

According to an embodiment, the spatial information and optionally the information on active speakers is input into a trained machine learning algorithm, which determines probabilities for conversation patterns. The determination of probabilities for conversation patterns may be determined with a machine learning algorithm, such as a deep neuronal network.

According to an embodiment, the spatial information is input into at least two different trained machine learning algorithms, each of which determines probabilities for conversation patterns, wherein the conversation groups are determined from the conversation patterns determined from the at least two machine learning algorithms. It may be that more than one machine learning algorithm are used for determining the conversation patterns.

Further aspects described herein relate to a computer program for controlling hearing devices, which, when being executed by a processor, is adapted to perform the method as described in the above and in the following and to a computer-readable medium, in which such a computer program is stored. A computer-readable medium may be a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect described herein relates to a hearing device system comprising a plurality of hearing devices, each hearing device being worn by a user, the users of the hearing devices having a conversation and the hearing devices being communicatively interconnected with each other for data exchange, wherein the hearing device system is adapted to perform the method of one of the previous claims. For example, the method may be completely performed by the processors of the hearing devices. However, it also may be that some steps of the methods are performed by auxiliary devices carried by the users (such as smartphones) and/or that some steps of the method are performed by an internet server, to which the hearing devices may be connected.

It has to be understood that features of the method as described in the above and in the following may be features of the computer program, the computer-readable medium and the hearing system as described in the above and in the following, and vice versa.

These and other aspects of the systems and methods described herein will be apparent from and elucidated with reference to the embodiments described hereinafter.

FIG. 1 shows a hearing device system 10, which comprises several hearing devices 12. Each hearing device 12 may be worn by a user on his head, for example behind the ear and/or in the ear.

Each hearing device 12 comprises a microphone 14, a processor 16 and an output device 18, such as a loudspeaker. It also may be that the output device 18 is adapted for supplying a cochlear implant. In an operation mode, the hearing device 12 acquires a sound signal with the microphone 14, the processor 16 processes the sound signal, for example for compensating a hearing loss of the user, and outputs the processed sound signal with the output device 18.

Each hearing device 12 furthermore comprises a communication interface 20 for wireless data communication with another hearing device 12. All the hearing devices 12 in the hearing device system 10 may be interconnected with each other in such a way and/or may form a communication network. In a further operation mode, a sound signal acquired with a microphone of one of the hearing devices 12 may be transmitted via this network to another hearing device 12 and may be output there with the output device 18 of the other hearing device 12.

Each hearing device also has a sensor 22, which is adapted for acquiring spatial information, such as a movement sensor and/or a position sensor. In a further operation mode, the hearing device system 10 may determine conversation groups based on the information acquired by the sensors 22 of the hearing devices 12 of the system 10 and may process the audio signals, such that only users belonging to a conversation group can hear each other. This will be described in more detail with respect to FIG. 2.

It may be that a hearing device 12 is communicatively interconnected via the communication interface 20 with an auxiliary device 24, which also may be carried by the user. The auxiliary device 24 may be a smartphone and/or also may comprise a sensor 22, which is adapted for acquiring spatial information, such as a movement sensor and/or a position sensor. Also the information acquired with the sensor 22 may be used in the method of FIG. 2. One, some or all of the users may carry such an auxiliary device 24.

Figure 2:
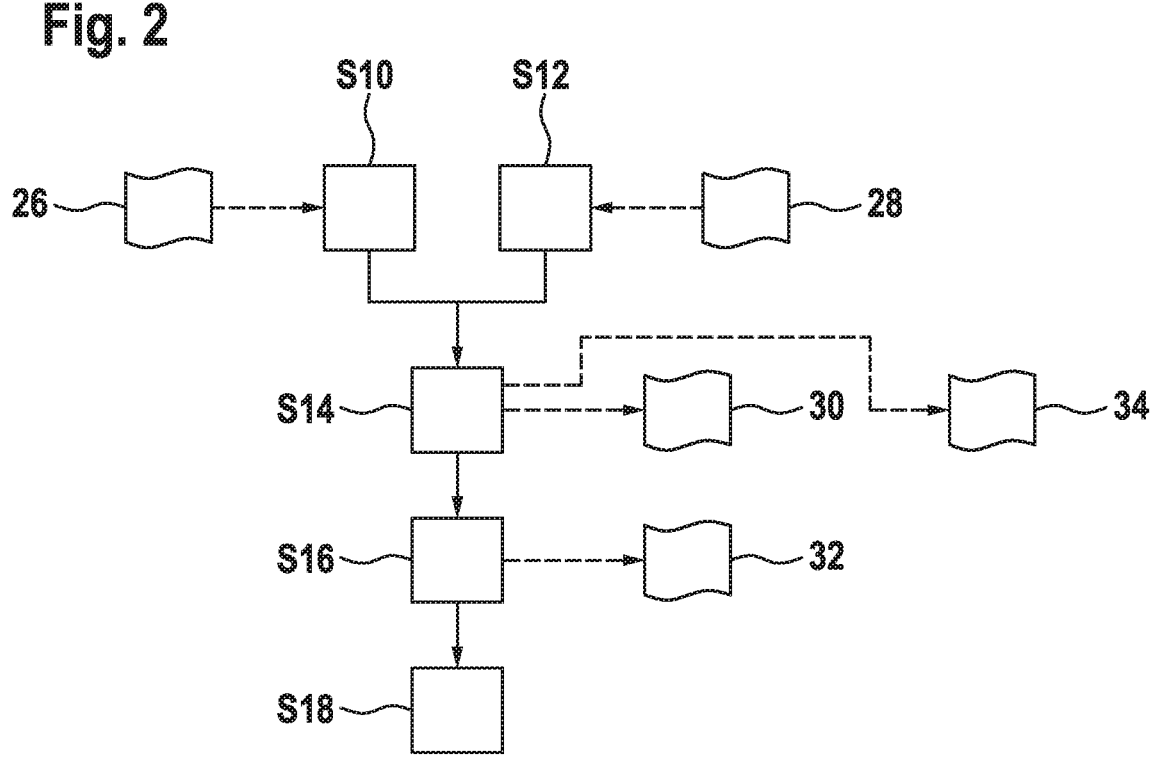
FIG. 2 shows a flow diagram for a method for controlling hearing devices according to an embodiment.

FIG. 2 shows a flow diagram for a method for controlling the hearing devices 12 and/or the hearing device system of FIG. 1. The method may be performed automatically by the hearing devices 12 (for example by their processors), i.e. the hearing device system 10 may be seen as a distributed system. It also may be that the method is at least partially performed by the one or more auxiliary devices 24 and/or by a server, which may be connected to the hearing devices 12 and/or the one or more auxiliary devices 24 via the Internet. The method steps or at least a part of the method steps may be performed in a cloud based system, in one of the hearing devices 12 and/or in one of the auxiliary devices 24.

In step S10, a sound signal 26 is determined for each user with a microphone 14 of the hearing device 12 of the user. The sound signal 26 may be indicated of the sounds generated in the vicinity of the user and/or by the user. In particular, when the user is speaking, the respective sound signal usually contains the voice of the user with a rather high signal-to-noise ratio. Furthermore, the respective sound signal 26 may contain the voice of other users, which are acquired with the microphone 14.

In step S12, spatial information 28 of each user is acquired with the sensor 22 of the hearing device 12 and/or with the sensor 22 of the auxiliary device 24 of the user.

For example, each user may be equipped with a movement sensor and a location sensor. Those sensors may be located in the hearing device 12 and/or in the auxiliary device 26, such as a smart watch, a smartphone, etc. worn on the body of the user. With a movement sensor, such as an acceleration sensor, a position of the body of the user and/or the head of the users may be determined. Further, an orientation and/or state of the body, such as standing, walking, sitting, walking the stairs up and down etc., may be determined. With a location sensor, such as a GPS sensor, the location of each user may be determined. From the positions, the system 10 may calculate for each user his/her distance to each other user in real time and/or dynamically.

In general, the spatial information 28 may comprise at least one of a position of the user, a distance of the user to another user, a direction of the user with respect to another user. The spatial information 28 for a user may be acquired with a movement sensor and/or a location sensor 22 of the hearing device 12 of the user. The spatial information 28 for a user may be acquired with a movement sensor and/or location sensor 22 of an auxiliary device 24 worn by the user, which is communicatively interconnected with the hearing device 12 of the user.

As an example, the positions of the users may be encoded in a matrix of size N×2, where N is the number of users, with coordinates for x and y axis in the plane with an absolute reference. However, also coordinates with three components are possible. The distances of the users may be encoded in a matrix of size N×N with entries being the distance between the users. The diagonal of this matrix may be composed of zeros.

Further spatial information, such as head positions of the users, head orientations of the users, deviation angles from a head orientation of a user with respect to other users, also may be collected and/or determined during step S12.

Figure 3:
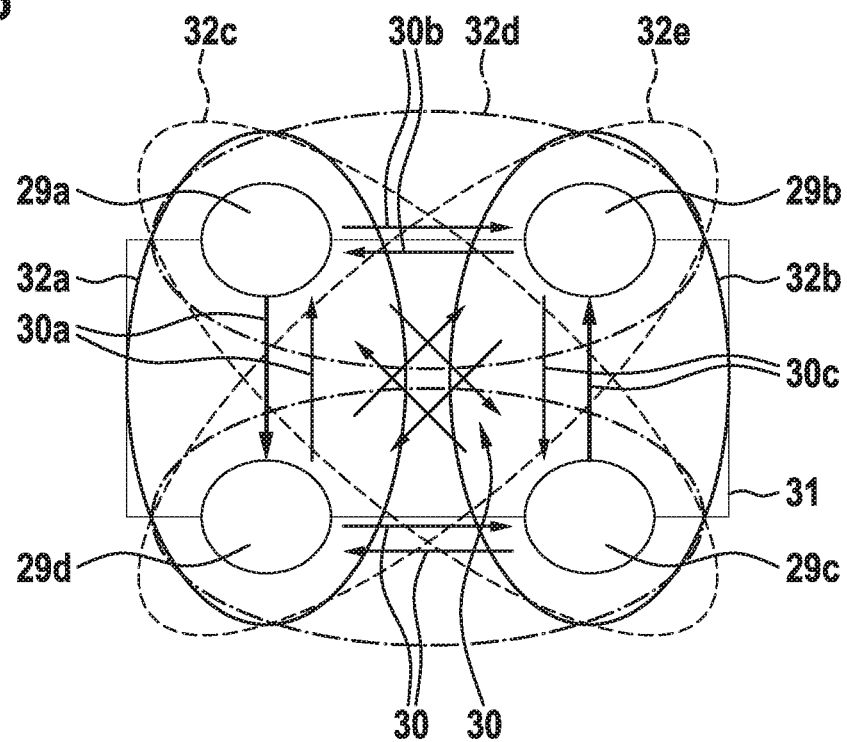
FIG. 3 illustrates conversation patterns used in the method of FIG. 2.

The following steps S14 and S16 also will be described with respect to FIGS. 3 and 4, which schematically shows 4 users 29a, 29b, 29c, 29d, which sit around a table 31. One feature of the method is to detect the number of parallel conversations of the users. FIG. 3 may show a conversation scenario of a restaurant with a squared table with 4 users 29a, 29b, 29c, 29d communicating within a system 10. In the beginning, all audio signals 26 may be streamed to all other hearing devices 12 for improved intelligibility. Sometimes, the user may have one conversation and one of the users is talking and the others are listening.

However, it also may be that the conversation changes over time, such that two by two users are conversating. In this case, there are three possibilities how two users out of four users can group to conversate.

FIG. 3 shows possible conversation patterns 30, 30a, 30b, 30c and/or listening paths, how one user can listen/hear to another user and some possible conversation groups 32a, 32b, 32c, 32d, 32e that may form during a conversation. Some of the conversation patterns have been provided with different reference numerals to indicate that there may be different patterns. Probabilities for the conversation patterns 30, 30a, 30b, 30c and the conversation groups will be determined during the steps S14 and S16.

It has to be noted that during step S12, further information useful for determining the conversation patterns 30, 30a, 30b, 30c, the conversation groups 32a, 32b, 32c, 32d, 32e and/or their probabilities may be collected and/or determined. Such further information may include active speakers, i.e. which user is speaking actively, a history of the conversation patterns, a parallel talking history, names of the users, etc. Such information also may have been collected before and may be stored in the system 10.

Returning to FIG. 2, in step S14, conversation patterns 30, 30a, 30b, 30c are determined from the spatial information 28 acquired for all users (and optionally the further information mentioned above). Each conversation pattern 30, 30a, 30b, 30c may comprise at least a probability that a user is talking to another user. As described below, these probabilities may be determined with a machine learning algorithm.

In general, the probabilities for conversation patterns may be based on the position of the users. Also, a probability of a conversation pattern 30, 30a, 30b, 30c with a first user and a second user may depend on a distance of the first user and the second user. The probability that a first user is listening to a second user may depend on the distance of the first user to the second user. As higher the distance as lower the probability may be. The probability also may depend on the head angle deviation of the first user with respect to the second user. As higher the deviation as lower the probability may be.

The head positions and/or orientations of the users 29a, 29b, 29c, 29d also may be used for determining the probability of a conversation pattern 30, 30a, 30b, 30c. For example, the probability of a conversation pattern 30, 30a, 30b, 30c with a first user and a second user may depend on the first user facing towards the second user.

From the head position and/or the head angle (i.e. the user watching in which direction), it may be determined, who is listening to who, who turns his attention to which active speaker and/or who might start to talk. The system 10 may continuously track the head movements of the user and/or may collect data to whom the user looks how frequently and most recently. The system 10 may build a history record over time a conversation takes place. This may be done for all users. The spatial information 28 of a user is indicative of head movements.

In step S14, also a conversation scenario 34 may be determined. A conversation scenario 34 may be indicative of a specific situation, the users are in. For example, the conversation scenario 34 may be indicative of users facing each other in the specific situation and/or of users facing in the same direction in the specific situation. The conversation scenario may be encoded with a number from a set of numbers. Also the conversation scenario 34 may be determined with a machine learning algorithm.

The conversation scenario 34 may be determined from the spatial information 28 and optionally the further information mentioned above and below. The conversation patterns 30, 30a, 30b, 30c may be determined additionally based on the conversation scenario 34.

An example for a conversation scenario 34 may be users sitting in a car. In a car, the users may not have the chance to look in the direction of the speaker of interest, which means that the interpretation of the head movements has to be different compared to the restaurant scenario.

As a further example, the seating position on a round or squared table may be different conversation scenarios 34. For example, from the positions of the users 29a, 29b, 29c, 29d, it may be determined that they are sitting on a round table, a squared table and/or standing. The distance to each other may influence natural conversations, which may be sometimes given through the geometry of the table. Some conversation patterns 30, 30a, 30b, 30c may be more probable than others. E.g. from sociological studies it is known, that it is more likely that users 29a, 29b, 29c, 29d are talking with someone sitting across than next to them. To distinguish the above cases, also head positions of the users 29a, 29b, 29c, 29d may be analyzed. Since humans mostly look in front direction, the seating arrangement may be derived from the average duration of head positions of all users.

As a further example, active speakers 36 may be determined. As an example, FIG. 4 illustrates that the probabilities for the conversation patterns 30, 30a, 30b, 30c with the fat arrows are much higher than the other ones. This may be due to the active speakers 36 as determined in step S14. The actual active speakers 36 may be determined by evaluating the sound signals 26 from the users.

The probability of a conversation pattern 30, 30a, 30b, 30c may be dependent on the users being active speakers or not. For example, the active speaker 36 with the shortest distance to the user may be more likely to be the target of a listening user than another active speaker 36 with a longer distance.

Furthermore, the probability of a conversation pattern 30, 30a, 30b, 30c with a user and the active speaker 36 may depend on a correlation of the sound signal 26 acquired by the hearing device 12 of the user and the sound signal 26 acquired by the hearing device 12 of the active speaker 36.

Each hearing device 12 may comprise a voice activity detector for the respective user. This function may be used to stream the own voice of each user only, when the user is talking to prevent introducing noises from all other microphones 14.

The result of all voice activity detectors of all hearing devices 12 may be used to determine active speakers. Those data may be binary signals for each user during the whole conversation. The active speakers 36 may be encoded in a vector of size N (where N is the number of users), where each entry is 1, when the user is talking, and 0, when the user is not talking.

Also the history of the active speakers 36 may be used for determining probabilities. There may be users, who are talking more and others who are not talking much. The users, whose active talking time is over average, are more likely to talk again. Also the duration of active talking between two conversational turns may have an individual pattern, which may be used as an input to an a priori probability, who is talking and/or to an a priori probability, who is listening to an active speaker.

A further information that may be used for determining probabilities are conversation rules. International valid conversation rules and norms exist. One rule defines the time, how long humans are waiting after a speech pause until a conversational turn. This duration can be used by the system 10 to raise an a priori probability of a conversation pattern 30, 30a, 30b, 30c. Such a speech pause may be detected based on the determined active speakers 36.

The history of conversational patterns 30, 30a, 30b, 30c may be used to calculate the a priori probability as well. Some users may more likely raise their voice after a specific user, who has finished his contribution.

A further information that may be used for determining probabilities is a parallel talking history. There may be diverse reasons for several users talking at the same time. Parallel active speakers 36 may not necessarily be an indication of parallel conversations. For this reason, different reasons for parallel active speakers 36 may have to be distinguished. Those may comprise overlapping speech within the same conversation, which may be based on the desire to start a contribution before another, so as not to miss the opportunity, the desire to make a particular contribution while it is relevant, uncertainty as to whether the current speaker intends to continue, active listening (little utterances, such as "mm-hmm", "Huh", etc.), side talks (quiet conversation that takes place between people who are sitting beside each other during main conversation) and/or subgroups (the conversation has split up into two or more groups of conversations).

Also, a history of conversation patterns 30, 30a, 30b, 30c and/or conversation groups 30, 30a, 30b, 30c may be stored and used for determining probabilities. The social relations and habits may influence the probability, frequency and duration of a conversation between individuals.

It also may be possible that the audio streams 26 are analyzed, if a user is saying the name of another user. It may be recognized, when a user wants to talk to someone by calling his name. Calling someone's name may be a strong indication for the start of a new conversation, especially when the head movements react accordingly. The system 10 may therefore recognize the names of the users with means of speech recognition. The speaker who is calling the name may be recognized with means of a speaker recognition algorithm.

In step S16, the one or more conversation groups 32a, 32b are determined from the conversation patterns 30, 30a, 30b, 30c, wherein the users are grouped into the conversation groups 32a, 32b by clustering conversation patterns 30, 30a, 30b, 30c based on their probabilities. For example, for all possible conversation groups 32a, 32b, probabilities are determined from the probabilities of the conversation patterns 30, 30a, 30b, 30c and/or optionally from the spatial information 28 and/or further information mentioned above.

Figure 4:
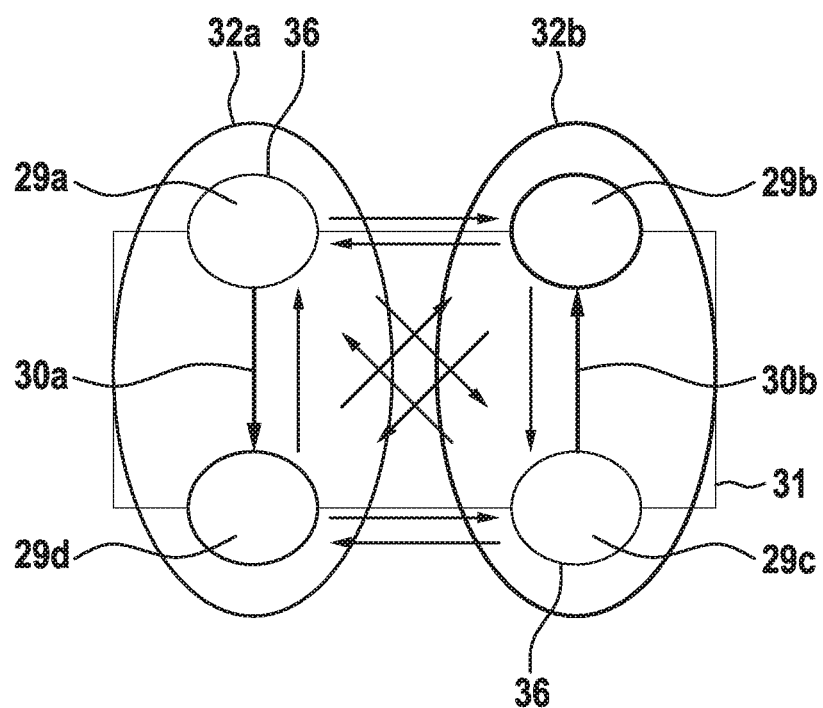
FIG. 4 illustrates conversation groups used in the method of FIG. 2.

For example, in FIG. 4 it is illustrated that the possible conversation groups (as shown in FIG. 3) have been reduced to the two most probable conversation groups 32a, 32b, each of which comprises two users 29a, 29b, 29c, 29d and one active speaker 36.

Step S18 may be performed by each hearing device 12. In step S18, some or all of the sound signals 26 are output with the hearing device 12, such that the sound signals 26 from users 29a, 29b, 29c, 29d of a conversation group 32a, 32b, where the user of the hearing device 12 is a member, are output to the user 29a, 29b, 29c, 29d and that sound signals 26 from users of conversation groups 32a, 32b, where the user is not a member, are muted. For example, the level of the sound signals 26 of active speakers 36 of other conversation groups 32a, 32b may be lowered or the attenuation of these levels may be stopped. In general, sound signals 25 from other conversation groups may be muted. In such a way, the signal-to noise-ratio of the output of the respective hearing device 12 may be enhanced.

Figure 5:
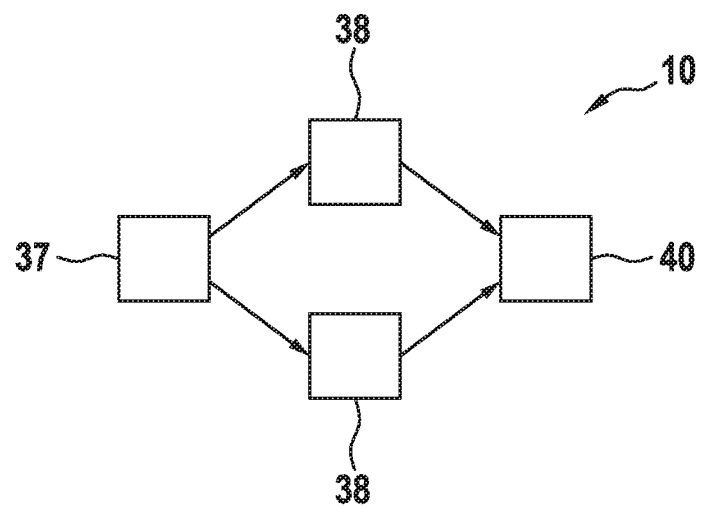
FIG. 5 schematically shows a functional design of a part of a hearing system according to an embodiment.

FIG. 5 schematically shows a functional design of the part of a hearing device system 10, which may perform steps S14 and S16 of the method. In particular, the system 10 may comprise an information acquisition module 37, one or more machine learning algorithm modules 38 and a decision module 40.

The information acquisition module 37 may collect the data and/or audio signals from the hearing devices 12 and may transform it, such that it may be input into the one or more machine learning algorithm modules 38. A machine learning algorithm module 38 may be used for determining probabilities for the conversation patterns 30, 30a, 30b, 30c and/or the conversation groups 32a, 32b. Instead of only one machine learning algorithm module 38, several machine learning algorithm modules 38 connected in parallel may be used to compute the probabilities. The decision module 40 in the end determines the conversation groups 32a, 32b, which are then used in step S18 for controlling the hearing devices 12. For example, the decision module may be based on a decision tree algorithm.

For example, the spatial information 28, which may be pre-processed by the module 37, may be input into one or more different trained machine learning algorithms 38, each of which determines probabilities for conversation patterns 30, 30a, 30b, 30c. The conversation groups 32a, 32b then may be determined from the conversation patterns 30, 30a, 30b, 30c determined from the at least two machine learning algorithms 38.

The machine learning algorithms 38 may be trained offline, i.e. before the method shown in FIG. 2 is performed. Data of specific sensors 22, 26 may be recorded in real life situations in diverse scenarios. Those data and the known resulted listening paths and conversation patterns ("To which active talker is each participant listening to?", "Which participant belongs to which subgroup?", "Which are the subgroups?") may be input into a classification algorithm to train offline the machine learning algorithms 38.

The machine learning algorithm 38 may be a (deep) neural network, a convolutional neural network, an algorithm based on Multivariate analysis of variance (Manova), a support vector machine (SVM) or any other machine learning algorithm or pattern recognition algorithm.

It also is possible that a user can manually interfere in the method as described with respect to FIG. 2. For example, the auxiliary device 24 may have a user interface with which the user can interact for influencing the forming of conversation groups 32a, 32b. For example, the user may manually split a conversation group 32a, 32b, may join a different conversation group 32a, 32b and/or may overwrite the decision of the system 10. There may be implementations between a fully automated implementation and fully manual steering.

LIST OF REFERENCE SYMBOLS 10 hearing device system
12 hearing device
14 microphone
16 processor
18 output device
20 communication interface
22 sensor
24 auxiliary device
26 sound signal
28 spatial information
29a, 29b, 29c, 29d user
30, 30a, 30b, 30c conversation pattern
31 table
32, 32a, 32b conversation group
32c, 32d, 32e possible conversation group
34 conversation scenario
36 active speaker
37 information acquisition module
38 machine learning algorithm/module
40 decision module While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for controlling hearing devices, each hearing device being worn by a user, the users of the hearing devices having a conversation and the hearing devices being communicatively interconnected with each other for data exchange to form a hearing device system,
wherein the method comprises:
acquiring a sound signal of each user with a microphone of the hearing device of the user;
acquiring spatial information of each user, the spatial information comprising at least one of a position of the user, a distance of the user to another user, a direction of the user with respect to another user;
determining conversation patterns from the spatial information acquired for all users, wherein each conversation pattern comprises at least a probability that a user is talking to another user;
determining conversation groups from the conversation patterns, wherein the users are grouped into the conversation groups by clustering conversation patterns based on their probabilities;
outputting the sound signals from the users with a hearing device, such that sound signals from users of a conversation group that the user of the hearing device is a member of are output to the user and that sound signals from users of conversations groups of which the user is not a member are muted.

2. The method of claim 1, further comprising:
determining a conversation scenario from the spatial information and determining the conversation patterns additionally based on the conversation scenario;
wherein a conversation scenario is indicative of a specific situation, the users are in.

3. The method of claim 2,
wherein the conversation scenario is indicative of users facing each other in the specific situation and/or of users facing in the same direction in the specific situation.

4. The method of claim 1,
wherein the probability of a conversation pattern with a first user and a second user is dependent on the first user facing towards the second user; and/or
wherein the probability of a conversation pattern with a first user and a second user is dependent on a distance of the first user and the second user.

5. The method of claim 1,
wherein the spatial information for a user is acquired with a sensor of the hearing device of the user.

6. The method of claim 1,
wherein the spatial information for a user is acquired with a movement sensor and/or a location sensor of the hearing device of the user; and/or
wherein the spatial information for a user is acquired with a movement sensor and/or location sensor of an auxiliary device worn by the user, which is communicatively interconnected with the hearing device of the user.

7. The method of claim 1,
wherein the spatial information of a user is indicative of head movements of the user; and/or
wherein the hearing device of the user is worn on the head of the user.

8. The method of claim 1, further comprising:
determining actual active speakers from the users by evaluating the sound signal from the users.

9. The method of claim 8,
wherein the probability of a conversation pattern with two users is dependent on the users being active speakers or not.

10. The method of claim 8,
wherein the probability of a conversation pattern with a user and the active speaker is dependent on a correlation of the sound signal acquired by the hearing device of the user and the sound signal acquired by the hearing device of the active speaker.

11. The method of claim 1,
wherein the spatial information is input into a trained machine learning algorithm, which determines probabilities for conversation patterns.

12. The method of claim 1,
wherein the spatial information is input into at least two different trained machine learning algorithms, each of which determines probabilities for conversation patterns;
wherein the conversation groups are determined from the conversation patterns determined from the at least two machine learning algorithms.

13. A non-transitory computer-readable medium for controlling hearing devices, each hearing device being worn by a user, the users of the hearing devices having a conversation and the hearing devices being communicatively interconnected with each other for data exchange to form a hearing device system, the non-transitory computer-readable medium storing a computer program that, when executed, directs a processor to:
acquire a sound signal of each user with a microphone of the hearing device of the user;
acquire spatial information of each user, the spatial information comprising at least one of a position of the user, a distance of the user to another user, a direction of the user with respect to another user;
determine conversation patterns from the spatial information acquired for all users, wherein each conversation pattern comprises at least a probability that a user is talking to another user;
determine conversation groups from the conversation patterns, wherein the users are grouped into the conversation groups by clustering conversation patterns based on their probabilities;
output the sound signals from the users with a hearing device, such that sound signals from users of a conversation group that the user of the hearing device is a member of are output to the user and that sound signals from users of conversations groups of which the user is not a member are muted.

14. A hearing device system comprising a plurality of hearing devices, each hearing device being worn by a user, the users of the hearing devices having a conversation and the hearing devices being communicatively interconnected with each other for data exchange;
wherein the hearing device system is adapted to
acquire a sound signal of each user with a microphone of the hearing device of the user;
acquire spatial information of each user, the spatial information comprising at least one of a position of the user, a distance of the user to another user, a direction of the user with respect to another user;
determine conversation patterns from the spatial information acquired for all users, wherein each conversation pattern comprises at least a probability that a user is talking to another user;
determine conversation groups from the conversation patterns, wherein the users are grouped into the conversation groups by clustering conversation patterns based on their probabilities;
output the sound signals from the users with a hearing device, such that sound signals from users of a conversation group that the user of the hearing device is a member of are output to the user and that sound signals from users of conversations groups of which the user is not a member are muted.

* * * * *